(12) United States Patent
Santee et al.

(10) Patent No.: US 6,854,089 B1
(45) Date of Patent: Feb. 8, 2005

(54) TECHNIQUES FOR MAPPING GRAPHICAL USER INTERFACES OF APPLICATIONS

(75) Inventors: John Santee, Scotts Valley, CA (US); Robert Warfield, Aptos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/412,403

(22) Filed: Oct. 5, 1999

Related U.S. Application Data

(60) Provisional application No. 60/121,197, filed on Feb. 23, 1999.

(51) Int. Cl.[7] .............................. G00G 5/00; G06F 9/44
(52) U.S. Cl. ....................... 715/783; 715/803; 715/804; 715/853; 717/125; 717/132
(58) Field of Search ................................ 345/855, 762, 345/763, 783, 853, 712, 778, 803, 804, 805, 440; 714/32, 33, 39; 717/125, 128, 132, 127, 105, 135

(56) References Cited

U.S. PATENT DOCUMENTS

| | | | | |
|---|---|---|---|---|
| 5,438,661 A | * | 8/1995 | Ogawa | ........................ 345/804 |
| 5,600,789 A | * | 2/1997 | Parker et al. | ................... 714/38 |
| 5,877,766 A | * | 3/1999 | Bates et al. | ................... 345/854 |
| 5,933,143 A | * | 8/1999 | Kobayashi | ................... 345/805 |
| 5,937,163 A | * | 8/1999 | Lee et al. | ..................... 709/218 |
| 6,097,388 A | * | 8/2000 | Goodfellow | ................. 345/807 |
| 6,144,962 A | * | 11/2000 | Weinberg et al. | ............ 345/749 |
| 6,189,019 B1 | * | 2/2001 | Blumer et al. | ............... 345/854 |
| 6,189,116 B1 | * | 2/2001 | Mongan et al. | ................ 703/22 |
| 6,378,088 B1 | * | 4/2002 | Mongan | ....................... 703/22 |
| 6,407,758 B1 | * | 6/2002 | Usami et al. | ................ 345/778 |

FOREIGN PATENT DOCUMENTS

EP 0869433 A2 * 10/1998 ........... G06F/11/00

* cited by examiner

*Primary Examiner*—John Cabeca
*Assistant Examiner*—Blaine Basom

(57) ABSTRACT

Techniques for generating maps of graphical user interfaces of applications are provided. An application mapper programmatically executes an application to generate a map of the graphical user interface of the application. The map can include windows, graphical user interface objects, actions, shortcuts, and transitions. The map can be utilized by a script generator to generate scripts that include instructions to test the application.

25 Claims, 12 Drawing Sheets

TECHNIQUES FOR MAPPING GRAPHICAL USER INTERFACES OF APPLICATIONS

CROSS-REFERENCE TO RELATED APPLICATIONS

This application claims the benefit of U.S. Provisional Application No. 60/121,197, filed Feb. 23, 1999, which is hereby incorporated by reference.

This application is related to U.S. patent application Ser. No. 08/655,149, filed May 30, 1996, now issued as U.S. Pat. No. 5,754,760, which is hereby incorporated by reference.

BACKGROUND OF THE INVENTION

The present invention relates to analyzing applications or software programs. More specifically, the invention relates to generating a map of the graphical user interface (GUI) for the generation of testing scripts, analysis of user interface correctness and user interface testing coverage.

The earliest software applications had relatively simple text based user interfaces. Typically, the application would prompt the user for the information the application required and the user entered the information via the keyboard. The early user interfaces worked well in their time but it is doubtful that computers would have reached their current wide spread use without the development of the graphical user interface (GUI).

GUIs enable users to start programs and chose commands by pointing to pictorial representations (icons) or lists of menu items on the screen. Typically, the pointing device is a mouse, track ball or touch pad. Thus, GUIs free the user from learning and remembering many complicated commands.

For application developers, GUIs provide an environment that includes standard mechanisms for users to interact with the computer. This allows the developer to concentrate on the application without spending unnecessary time in designing the user interface. It also enables the developer to create programs that handle frequently performed tasks in the same way because the developer can use the same standard mechanisms.

The user friendliness of GUIs, however, comes at a fairly significant cost in other areas. For example, testing a software product with a GUT may exceed half of the total project cost, where a significant portion of the cost of testing can be attributed to the added complexities of the GUI. The steadily increasing cost of testing has created a more urgent need for advancements in testing technology. Unfortunately, software testing tools have thus far failed to keep pace with the needs of the industry.

One standard software testing tool is the code coverage analyzer. With code coverage analyzers, developers typically hire test personnel with substantial programming experience to generate test cases that execute the application under test (AUT). The code coverage analyzers provide an abstract score of code coverage, which allows the test personnel to analyze the code that was not covered and create new test cases to execute that code. Software testing utilizing a code coverage analyzer is generally a very time consuming task. Additionally, for the best results, experienced test personnel may be required, but they are often difficult to find.

Another standard software testing tool is the script automation system. Script automation systems operate by running scripts that were created manually, either by directly typing them in or by recording the steps a user took and then playing them back at a later time using the script. Scripts that are generated manually may require experienced test personnel as with code coverage analyzers. Although the level of skill required for test personnel that execute the program so that a script can be recorded may be less, it still takes a substantial amount of time to generate multiple scripts in this manner. Furthermore, it may be difficult, if not impossible for the test personnel to exercise most all of the aspects of the graphical user interface.

What is needed, therefore, are techniques for mapping the graphical user interfaces of applications. In particular, what is needed is an automated application mapper that generates a map of the graphical user interface of the application, which can be utilized in conjunction with script generators and application testers to test the application.

SUMMARY OF THE INVENTION

The present invention provides techniques for mapping graphical user interfaces of applications. More specifically, an embodiment of the invention recursively manipulates the GUI of an application 1o generate a map of the GUI of the application. The map can be a hierarchical map including windows, user interface objects, actions, transitions, and shortcuts. The application map can be used for a number of purposes including as a reference for generating scripts to test the application. Some specific embodiments of the invention are described below.

In one embodiment, the invention provides a computer implemented method of mapping a graphical user interface of an application. A first set of windows that are active on the desktop of the computer are identified. An action on a graphical user interface object in a window of the application is performed and a second set of windows that are active on the desktop of the computer are identified. The first set of windows is compared to the second set of windows to identify a new window in the second set Once identified, the new window is added to a map of the graphical user interface of the application. In preferred embodiments, the user is provided the capability to specify that specific windows should be considered the same or that windows that have been determined to be the same should instead be considered different.

In another embodiment, the invention provides a system for testing applications. The system includes an application mapper that programmatically executes an application to generate a map of the graphical user interface of the application. A script generator utilizes the map to generate scripts that include instructions to test the application. An application tester executes the scripts to test the application. Typically, the application mapper generates the map by recursively performing actions on the graphical user interface of the application to identify new windows and add the new windows to the map.

Other features and advantages of the invention will become readily apparent upon review of the following description in association with the accompanying drawings.

DETAILED DESCRIPTION OF PREFERRED EMBODIMENTS

In the description that follows, the present invention will be described in reference to embodiments that generate application maps (or maps) of GUIs in order to generate scripts for testing the applications. More specifically, the embodiments will be described in reference to generating an application map that can be utilized to efficiently and thoroughly test the application. However, application maps generated by embodiments of the invention are not limited to testing applications nor are they limited to any particular language, computer architecture or specific implementation. Therefore, the description of the embodiments that follows is for purposes of illustration and not limitation.

Figure 1:
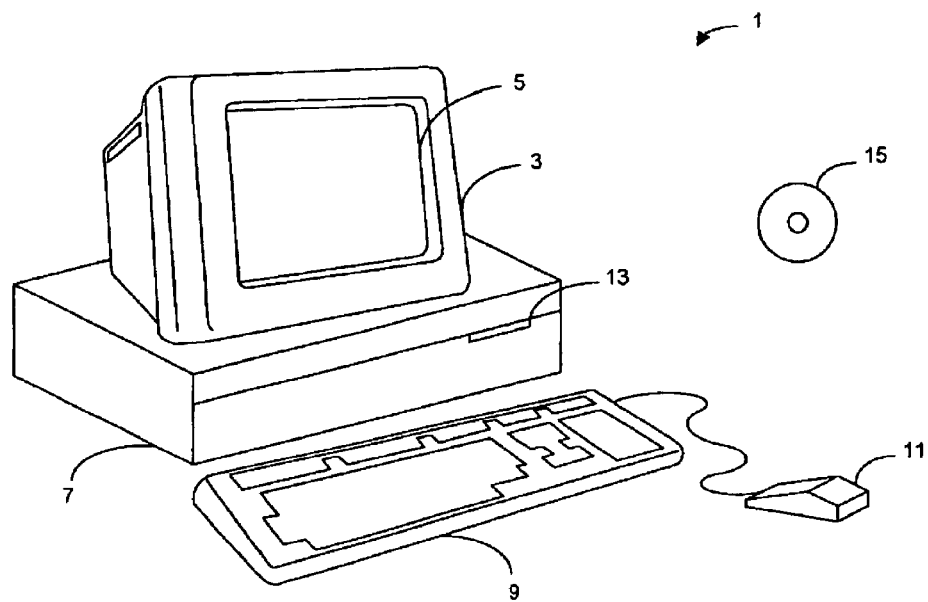
FIG. 1 illustrates an example of a computer system that can be utilized to execute the software of an embodiment of the invention.

FIG. 1 illustrates an example of a computer system that can be used to execute the software of an embodiment of the invention. FIG. 1 shows a computer system 1 that includes a display 3, screen 5, cabinet 7, keyboard 9, and mouse 11. Mouse 11 can have one or more buttons for interacting with a graphical user interface. Cabinet 7 houses a CD-ROM drive 13, system memory and a hard drive (see FIG. 2) which can be utilized to store and retrieve software programs incorporating computer code that implements the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g, in a network including the Internet) can be the computer readable storage medium.

Figure 2:
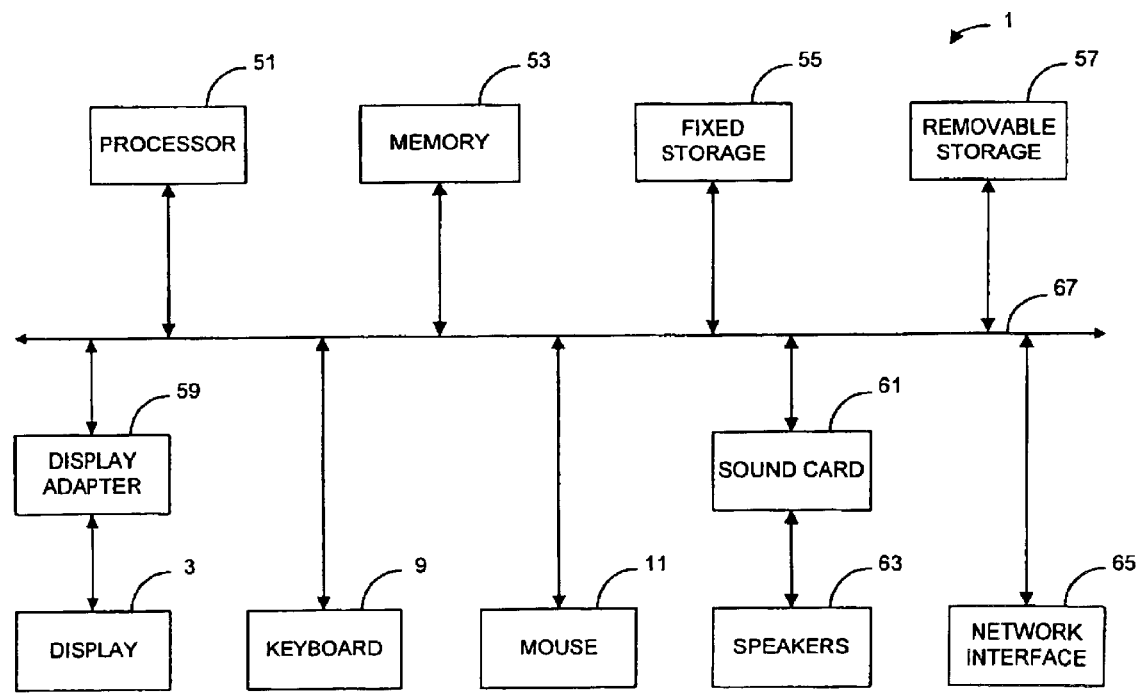
FIG. 2 illustrates a system block diagram of the computer system of FIG. 1.

FIG. 2 shows a system block diagram of computer system 1 used to execute the software of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g, hard drive), removable storage 57 (e.g., CD-ROM drive), display adapter 59, sound card 61, speakers 63, and network interface 65. Other computer systems suitable for use with the invention can include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems can also be utilized.

Figure 3:
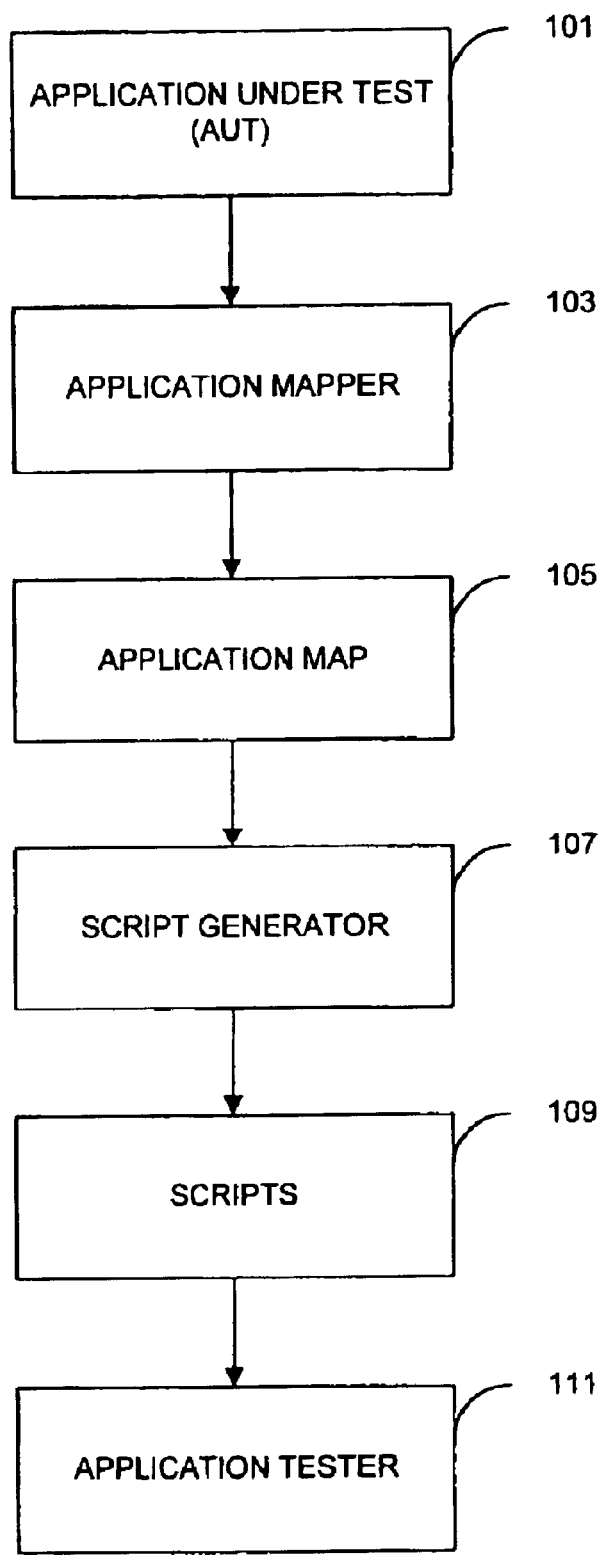
FIG. 3 illustrates the flow of a system for testing applications including an application mapper that generates a map of the graphical user interface of the application.

FIG. 3 shows a system that can be utilized to test an application by mapping the graphical user interface of the application and utilizing the application map to test the application. As shown, an application under test (AUT) 101 is executed by an application mapper 103. In general, application mapper 103 operates in a recursive loop that alternates between interacting with AUT 101 and recording the resulting user interface changes. The AUT can be traversed in a depth first manner in order to create a map of the graphical user interface. Accordingly, application mapper 103 creates an application map 105.

An application map is a hierarchical representation of the graphical user interface. Application maps can include numerous objects including windows, graphical user interface objects, actions, transitions, and shortcuts (or pointers). Examples of graphical user interface objects are buttons, sliders, check boxes, tab controls, and the like. Additionally, examples of actions are left mouse click, right mouse click, left mouse double click, key strokes, and the like. Although the application map is most easily shown as it is displayed on the monitor of a computer system an application map can be represented in memory as a hierarchical representation of objects. Therefore, application maps are not limited solely to the form in which they are displayed.

A script generator 107 utilizes application map 105 to generate scripts 109. In essence, script generator 107 utilizes the application map as a road map for scripts that exercise AUT 101. In a preferred embodiment, the script generator utilizes a genetic algorithm in order to generate the scripts. The genetic algorithm can include an iterative process of creating a population of scripts, running the population in conjunction with the AUT, ranking the population by fitness (e.g., such as complete code coverage), and then generating a new population. Such a script generator is described in full detail in U.S. patent application Ser. No. 08/655,149, filed May 30, 1996, which is hereby incorporated by reference. Other script generators that are known or have not yet been designed can also be utilized to generate scripts from application map 105.

Scripts 109 are designed to exercise AUT 101 and therefore include actions that are to be performed on the AUT. An application tester 111 utilizes the scripts to exercise AUT 101 and can also collect information regarding the execution of the AUT. For example, application tester 111 can collect statistics on code coverage, identify bugs, find critical sections of code, and the like.

Figure 4:
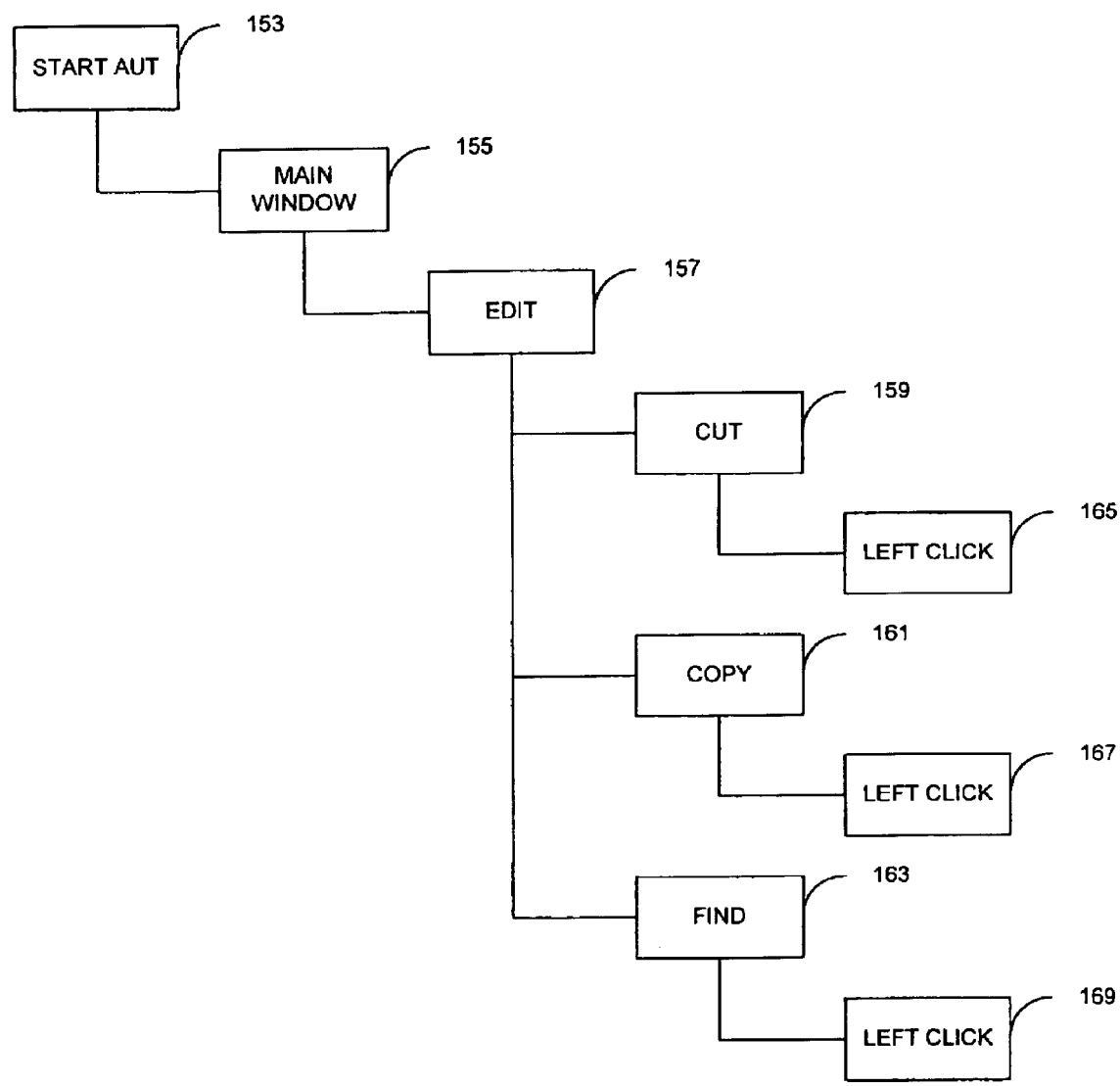
FIG. 4 shows an example of a hierarchical application map.

Now that one embodiment of a system of the invention has been described in some detail, it may be beneficial to illustrate how an application map can be created. FIG. 4 shows an example of an application map. An application map 151 includes at the highest level a START AUT object 153. START AUT object 153 represents the action that began execution of the application. A MAIN WINDOW object 155 shows that a main window was generated by the application.

An EDIT object 157 represents a pull down menu for the main window. From the EDIT pull down menu, a user is able to perform the operations of cut, copy and find. Accordingly, a CUT object 159, a COPY object 161 and a FIND object 163 are shown below EDIT object 157. LEFT CLICK objects 165, 167 and 169 represent that these actions are valid for their parent objects. The application map shown in FIG. 4 is very simple and is designed to illustrate the hierarchical nature of an application map.

Figure 5:
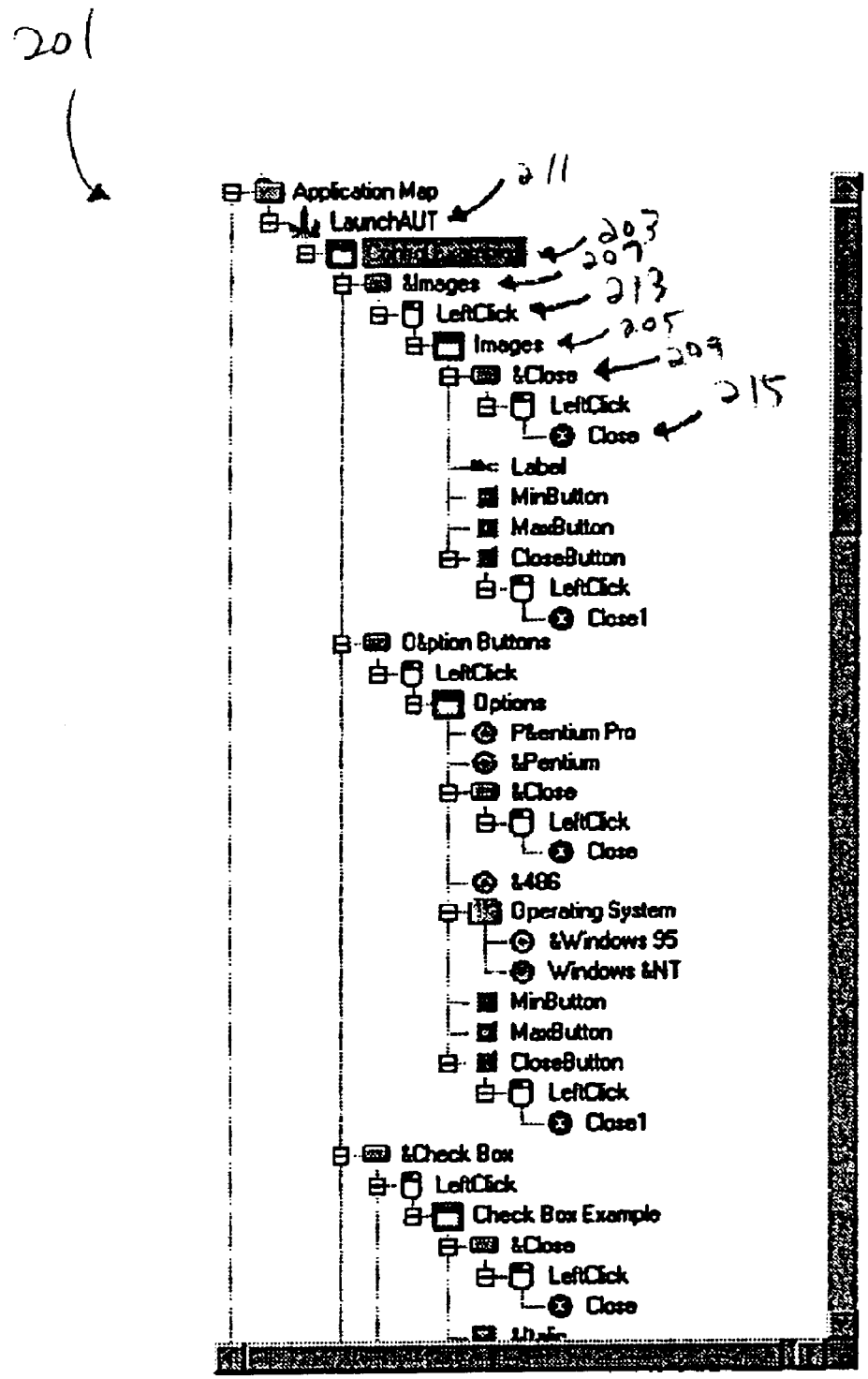
FIG. 5 shows another example of a hierarchical application map.

FIG. 5 shows another example of an application map. An application map 201 includes windows, graphical user interface objects, actions, and transitions. As shown, application map 201 is a hierarchical structure representing the graphical user interface of the application. Objects 203 and 205 represent windows in the graphical user interface. Graphical user interface objects 207 and 209 represent objects with which users can interact.

Actions 211 and 213 represent actions that can occur (or have occurred) in the application due to user input. More specifically, action 211 represents that a user launched the application and action 213 represents that the user performed a left mouse click. Transition 215 represents that an event closed a window or dialog box. Other transitions include an exit transition where an application is exited in a normal fashion (e.g., clicking "exit") and crash transitions where the application crashed during mapping. Still other behavior can be recorded; like additional GUI behavior (e.g., size or position of a window) and states of the application. Although it is not necessary to describe application map 201 in great detail, it should be evident that the application map is a hierarchical mapping of the graphical user interface of the AUT.

Now that exemplary application maps have been described, an embodiment that A constructs an application map will be described. Although for simplicity, the following will discuss a single process that generates an application map, other embodiments can concurrently construct a map utilizing multiple processes on multiple computer systems.

Figure 6:
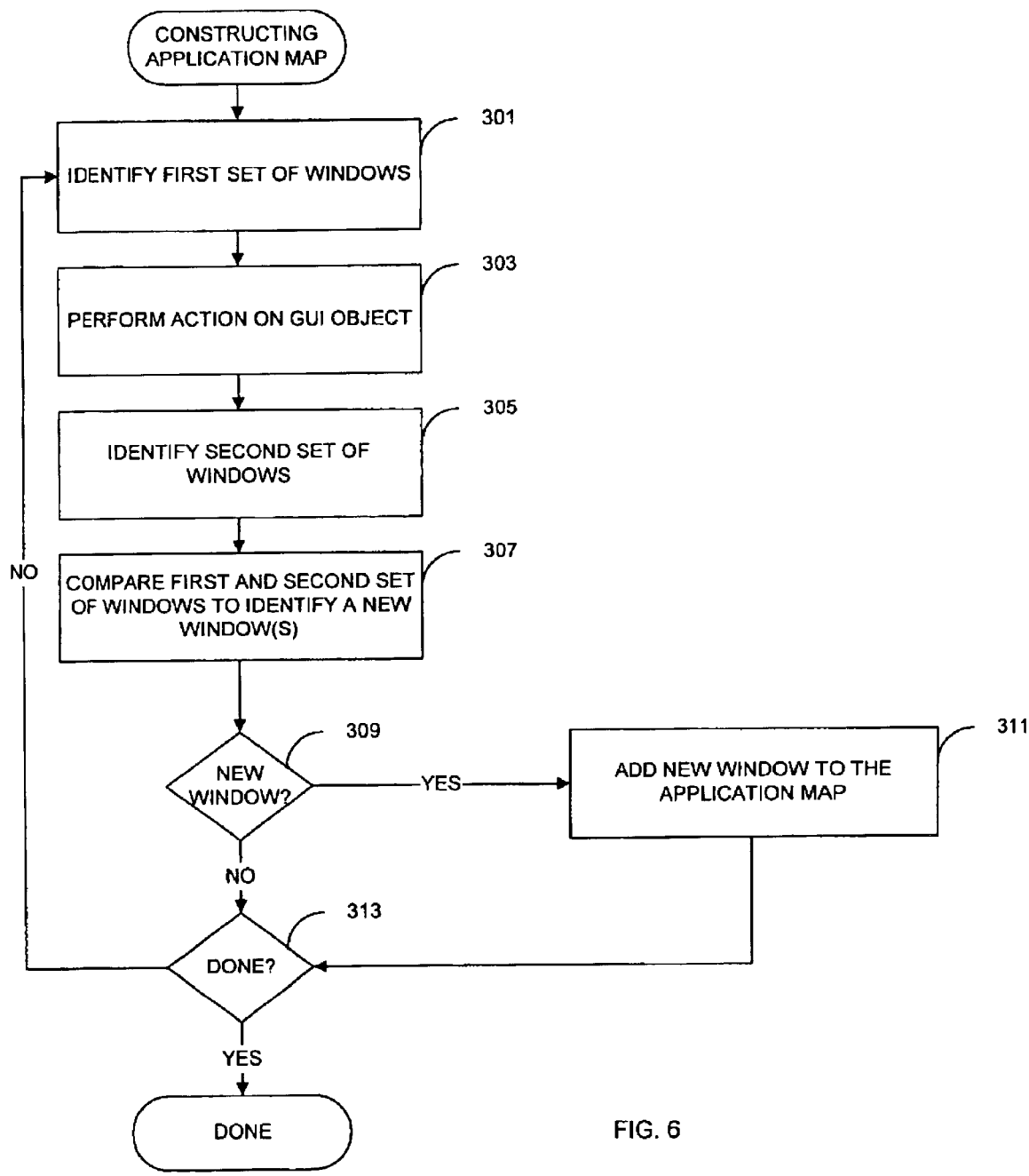
FIG. 6 shows a flow chart of a process of constructing an application map.

FIG. 6 shows a flow chart of a process of constructing an application map. At a step 301, a first set of windows that are active on the desktop of the computer are identified. Identifying the first set of windows can include enumerating the top level windows and graphical user interface objects therein.

An action on a graphical user interface object in a window of the application is performed at a step 303. In preferred embodiments, the action that is performed can include launching the AUT, which may produce a launchAUT action at the highest level of the application map (see FIG. 5). Once an action is performed, a second set of windows that are active on the desktop of the computer are identified at a step 305.

At a step 307, the first and second set of windows are compared to identify one or more new windows in the second set of windows. As will be described in more detail below, determining whether two windows are the same can involve comparing the graphical user interface objects that are available in each window. If the windows are similar enough (e.g., cross a similarity threshold), then the windows are considered the same for the purposes of mapping of AUT. In other embodiments, the AUT can be compiled to save additional information about the windows, for example the name of the window, so that the application mapper can utilize the names of the windows to determine if windows are the same.

If it is determined that there is a new window at a step 309, the new window is added to the application map of the graphical user interface of the application at a step 311. In other embodiments, additional GUI objects can also be added to the application map when they are encountered.

At a step 313, it is determined whether the mapping of the AUT is done and if it is not done, the process returns to step 301. The process shown in FIG. 6 can be implemented as a recursive process. For example, the process can be recursive and create a depth first search through the graphical user interface of the application. Of course, the process is not required to be recursive and other searching methodologies including breadth first searches can be utilized.

The creation of an application map can take a long time and require large amounts of processing power so in a preferred embodiment of the invention, a user is able to specify that only the first level of the graphical user interface will be mapped. By mapping only the first level of the graphical user interface, the application can be more efficiently mapped and if any problems during mapping are detected, they can be corrected and a more detailed application map can be subsequently created. Additionally, in some embodiments a user can specify the level to which the application map will be generated. The following paragraphs will provide further details on many of the steps of FIG. 6.

Figure 7:
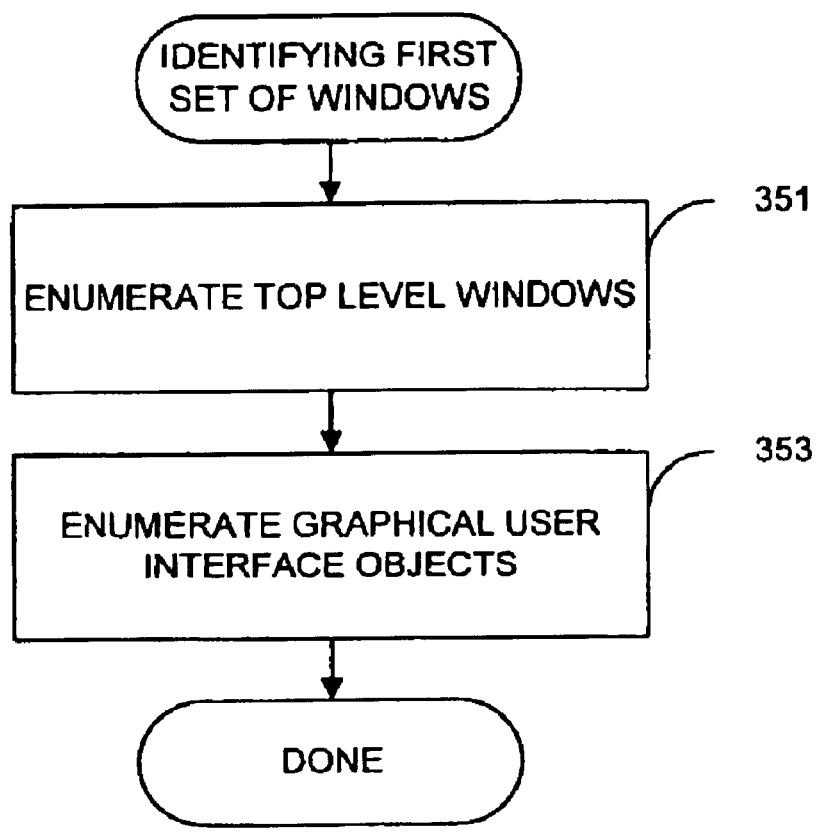
FIG. 7 shows a flow chart of a process of identifying a first set of windows that are active on the desktop of a computer.

FIG. 7 shows a flow chart of a process of identifying a first set of windows. The flow chart shown represents further details on step 301 of FIG. 6. At a step 351, the top level windows are enumerated. Accordingly, the top level windows are identified and ordered so that the set of top level windows may be easily compared to another set of top level windows.

The user interface objects of each top level window are enumerated at a step 353. The user interface objects are identified and ordered so that the user interface objects can be compared to user interface of other windows. Additionally, the ordering of user interface objects makes it easier to recursively activate the user interface objects to create the application map.

Figure 8:
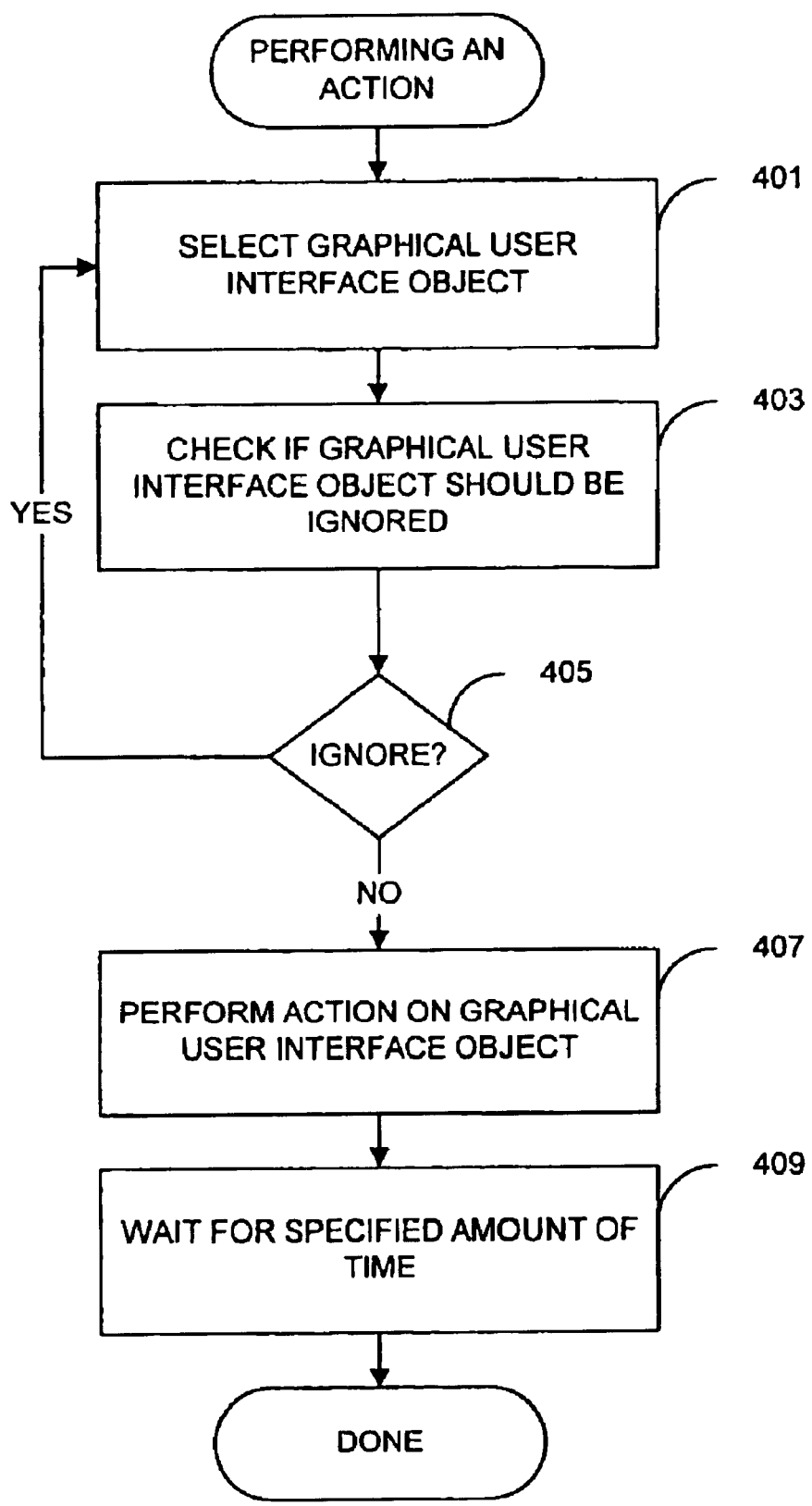
FIG. 8 shows a flow chart of a process of performing an action on a graphical user interface object of an application.

FIG. 8 shows a flow chart of a process of performing an action on a graphical user interface object in a window of the application. The flow chart shown in FIG. 8 represents further details that can be utilized in step 303 of FIG. 6. At a step 401, a graphical user interface object in a window of the application is selected. A check can then be performed to determine if the user interface object should be ignored at a step 403. In generating an application map, it is sometimes beneficial to allow a user to specify that certain user interface objects should be ignored while generating the application map. For example, user interface objects that cause the application to send documents to the printer can waste paper and slow down the mapping of a graphical user interface if they are not ignored. Additionally, graphical user interface objects that are known to crash the application, run code that has yet to be written, execute code that has already been tested, and the like can also be ignored. If it is determined at a step 405 that the graphical user interface object should be ignored, another graphical user interface object is selected at step 401.

At a step 407, an action is performed on the graphical user interface object. The action can include single or double mouse clicks, and key strokes on a keyboard. Once an action is performed, the application mapper can wait for a specified amount of time at a step 409. In preferred embodiments, the user can specify the amount of time that the application mapper will wait after an action is performed before proceeding to identify new windows in the graphical user interface of the application.

Figure 9:
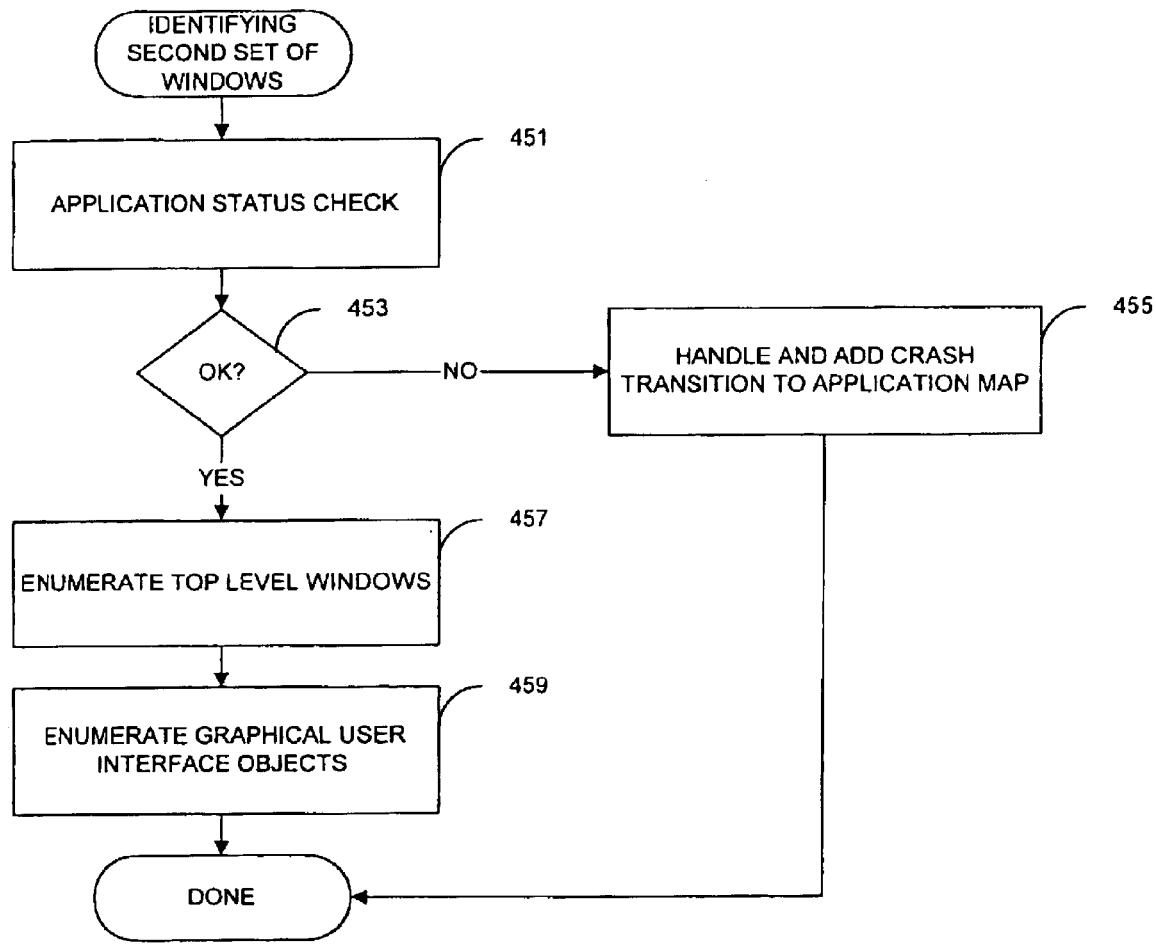
FIG. 9 shows a flow chart of a process of identifying a second set of windows that are active on the desktop of the computer.

FIG. 9 shows a flow chart of a process of identifying a second set of windows that are active on the desk top of the computer. The flow chart shown in FIG. 9 provides more detail that can be utilized at step 305 of FIG. 6. At a step 451, a status check is performed on the application. The status check can be utilized to determine if the application has crashed or otherwise halted (e.g., raised an exception that is not handled by the application). If it is determined that the application is not functioning properly at a step 453, the application mapper can attempt to handle the error and add the error to the application map at a step 455. For example, if it is determined that the application has crashed, the application mapper can insert a crash transition in the map at the appropriate location and restart the application and traverse the application map in order to continue mapping the graphical user interface.

If the application is functioning properly, the top level windows of the application are enumerated at a step 457 and the graphical user interface objects are enumerated at a step 459. The enumeration of the top level windows and graphical user interface objects shown in FIG. 9 can be the same as those described in reference to FIG. 7.

Figure 10:
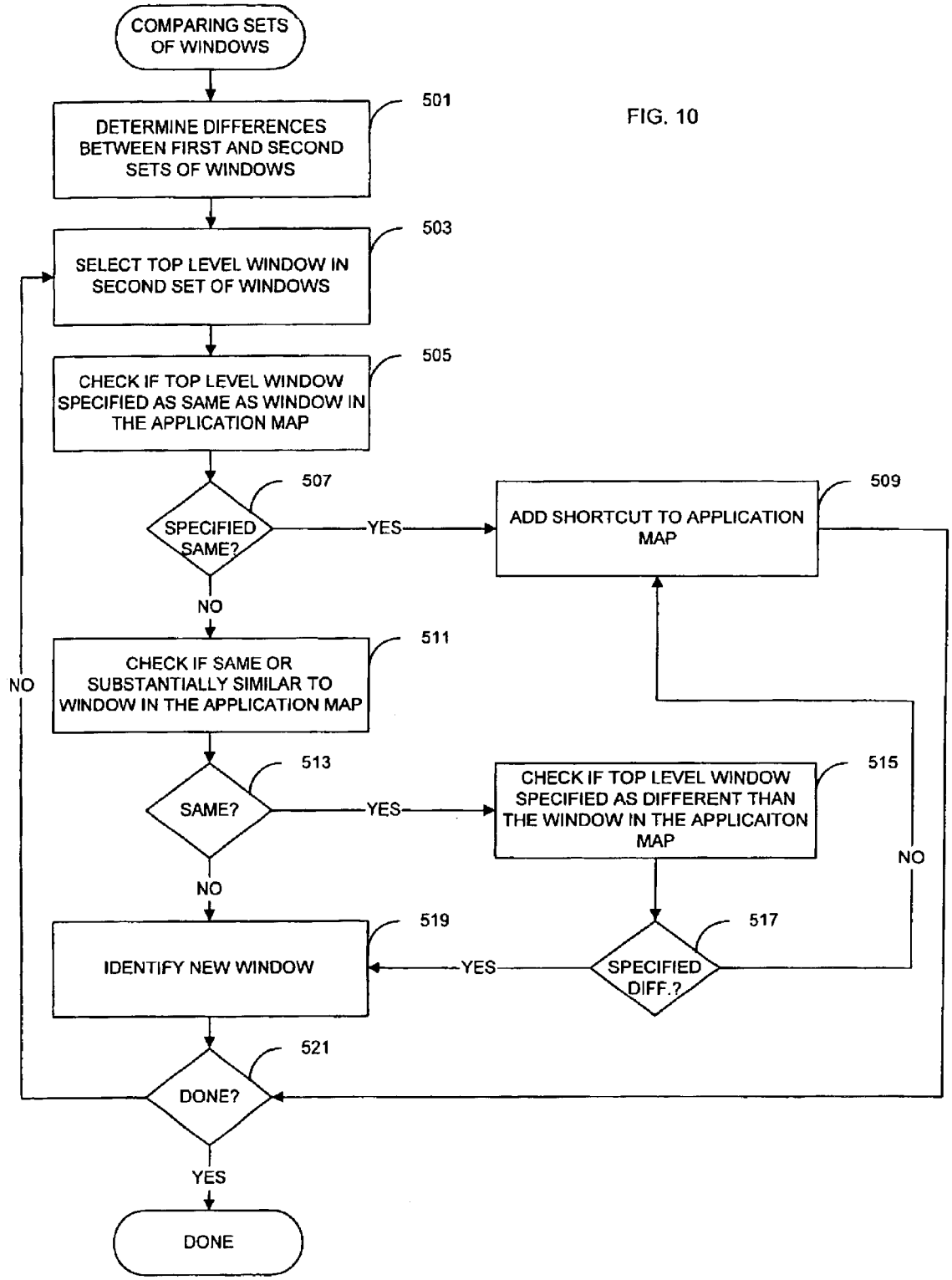
FIG. 10 shows a flow chart of a process of comparing sets of windows to identify new windows.

FIG. 10 shows a flow chart of a process of comparing sets of windows in order to identify new windows. The flow chart shown in FIG. 10 can provide more details to step 307 of FIG. 6. At a step 501, differences between the first and second set of windows are determined in order to identify top level windows that are present in the second set of windows but are not present in the first set of windows. A top level window that is present in the second set of windows but not in the first set of windows is selected at a step 503. Because the top level window is present in the second set of windows and not the first set of windows, the top level window represents a potentially new window in the graphical user interface of the AUT.

Figure 11:
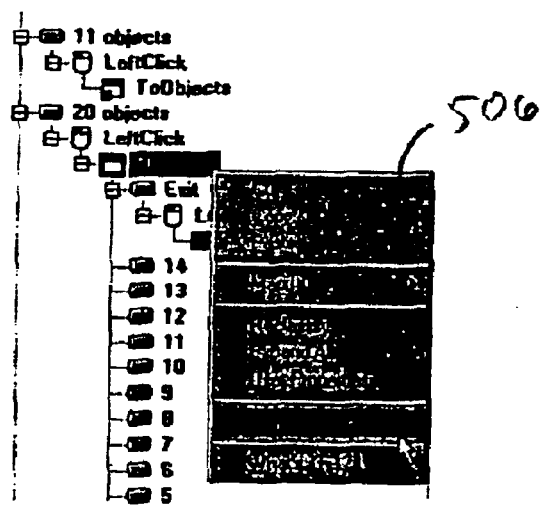
FIG 11 shows an example of a menu in which a user can select to have two or more windows merged.

At a step 505, a check is performed to determine if the selected top level window is specified as being the same as a window that currently exists in the application map. Once an application map is generated, a user can review the application map and notice that the application mapper has determined that two windows are different and have identified them as such in the application map. The user can then determine that either the windows are actually the same or that they should be considered the same (e.g., in order to simplify the application map). FIG. 11 shows an example of a menu 506 in which a user can select to have two or more selected windows merged into the same window (i.e., considered the same window). The user merges the windows by selecting the menu "MERGE WINDOWS" that is shown in menu 506.

Figure 12:
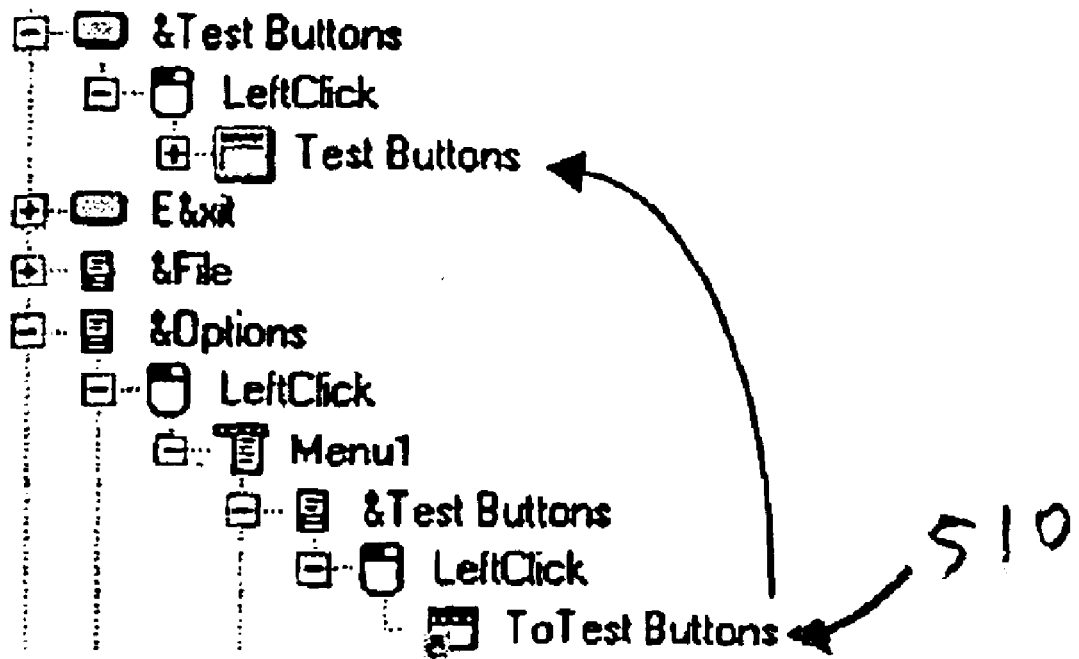
FIG. 12 shows an application map that includes a shortcut to another window that has been determined to be the same or substantially similar to the window represented by the shortcut.

If it is determined that the selected top level window is specified as being the same as another window in the application map at a step 507, the application mapper adds a shortcut to the application map at a step 509. A shortcut is essentially a pointer to another window on the application map so that the application mapper does not map portions of the graphical user interface more than once. Using shortcuts not only reduces time in generating the application map and simplifies the application map that is generated, it also helps prevent the application mapper from getting in an infinite loop mapping windows. FIG. 12 shows an example of a shortcut in an application map. A shortcut 510 is essentially a pointer to the menu identified by the arrow that represents the shortcut pointer.

At a step 511, the application mapper checks to determine if the selected top level window is the same or substantially similar to a window in the application map. The windows can be compared by determining the percentage of graphical user interface objects that the windows have in common. Accordingly, the application mapper can allow a user to specify a similarity threshold (e.g., 80%) that will be utilized when comparing the windows. If the similarity of the windows is above the similarity threshold, the application mapper considers the windows to be the same.

Figure 13:
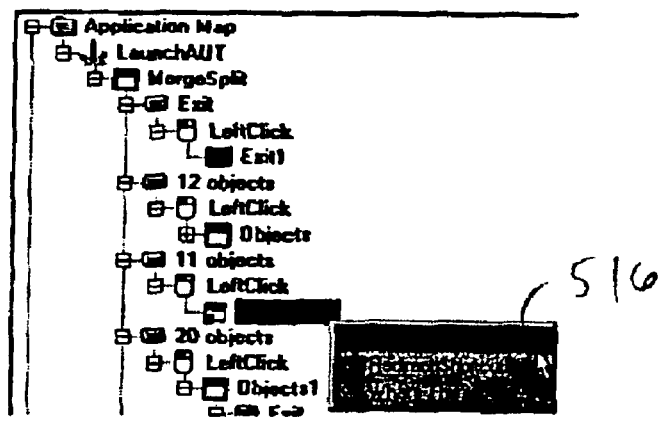
FIG. 13 shows an example of a menu in which a user can specify that a shortcut should be split.

If the windows are determined to be the same at a step 513, the application mapper checks if the selected top level window has been specified as being different than the window in the application map at a step 515. A user may analyze the application map that has been generated and decide that it would be preferable if two windows that have been determined to be the same or substantially similar should be instead considered different. The user can then specify that the application mapper should consider the windows different when generating the application map. FIG. 13 shows an example of a menu 516 in which a user can specify that a shortcut should be split from the window to which it is directed. For example, the user may specify the "SPLIT WINDOW" in menu 516 to split the shortcut from the window to which it refers. If the selected top level window is not specified as being different, the application mapper adds a shortcut at step 509. Otherwise, the application mapper has identified a new window at a step 519. The application mapper then adds the new window to the application map that has been generated for the AUT.

At a step 521, it is determined whether the top level windows in the second set of windows that are not in the first set of windows have all been processed. If all the top level windows in the second set of windows have not been processed, the application mapper proceeds to step 503.

Figure 14:
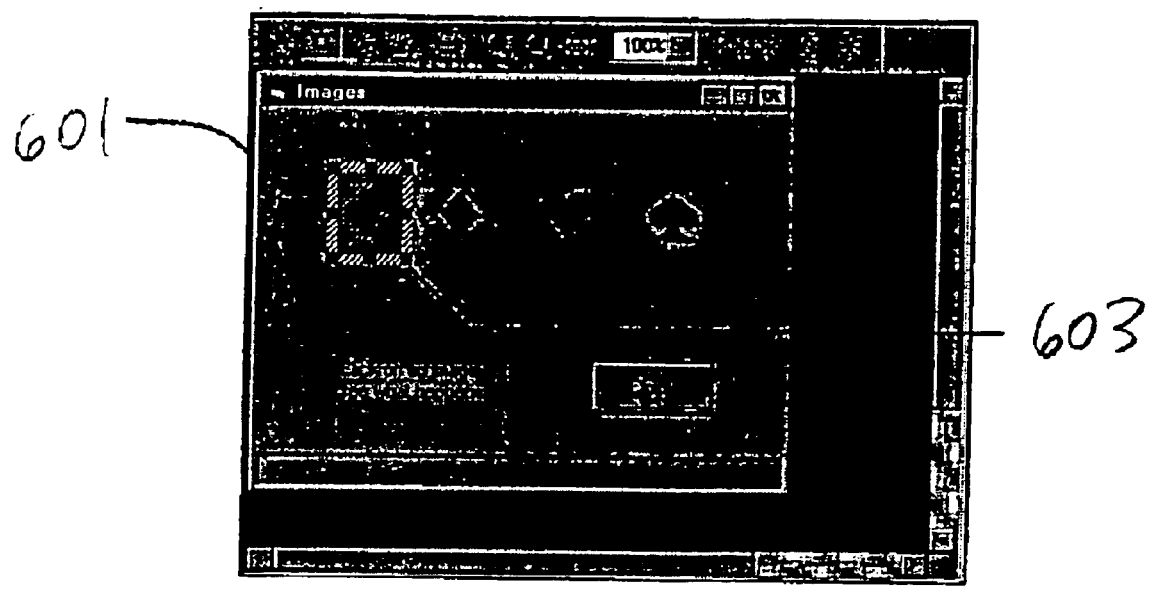
FIG. 14 shows a user specifying a portion of the screen as a graphical user interface object.

The above has described how embodiments of the invention can produce application maps of the graphical user interface of an AUT. Additionally, preferred embodiments include other features that allow the user to create better application maps. For example, the application mapper may not recognize that areas of the screen can be activated by actions such as a mouse click. If a user notices that the application mapper has not recognized the graphical user interface object, preferred embodiments of the invention allow the user to specify that an area of the screen can be acted upon. FIG. 14 shows an example of an embodiment that allows a user to specify that an area of the screen can be acted upon by the user. A window 601 includes four shapes corresponding to the different suits in a common deck of cards. In this example, the application mapper has not identified that the suits may be activated by a left mouse click on the suits.

Accordingly, the user is allowed to specify an area 603 and designate that it can be acted upon by a left mouse click. As with any other time when the user has changed the way the application mapper views the application, the user can then direct the application mapper to recreate the application map. When the application mapper recreates the application map, the application mapper will then use this area as a graphical user interface object in a window of the application map and generate the application map accordingly.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

What is claimed is:

1. A computer implemented method of mapping a graphical user interface of an application, comprising:
   identifying a first set of windows that are active on the desktop of the computer;
   performing an action on a graphical user interface object in a window of the application;
   identifying a second set of windows that are active on the desktop of the computer;
   comparing the first set of windows to the second set of windows to identify a new window in the second set;
   adding the new window to a map of the graphical user interface of the application; and
   displaying the map on the computer.

2. A computer implemented method of mapping a graphical user interface of an application, comprising:
   identifying a first set of windows that are active on the desktop of the computer;
   performing an action on a graphical user interface object in a window of the application;
   identifying a second set of windows that are active on the desktop of the computer;
   comparing the first set of windows to the second set of windows to identify a new window in the second set; and
   adding the new window to a map of the graphical user interface of the application, wherein the map is hierarchical and includes windows, graphical user interface objects and actions.

3. A computer implemented method of mapping a graphical user interface of an application, comprising:
   identifying a first set of windows that are active on the desktop of the computer;
   performing an action on a graphical user interface object in a window of the application;
   identifying a second set of windows that are active on the desktop of the computer;
   comparing the first set of windows to the second set of windows to identify a new window in the second set;
   analyzing the map to determine if the new window is already present in the map, wherein the new window is determined to already be present in the map if similarities between the new window and the window in the map are above a similarity threshold; and
   adding the new window to a map of the graphical user interface of the application.

4. The method of claim 3, wherein the similarity threshold is a percentage of graphical user interface objects that the new window and the window in the map have in common.

5. A computer implemented method of mapping a graphical user interface of an application, comprising:
   identifying a first set of windows that are active on the desktop of the computer;
   performing an action on a graphical user interface object in a window of the application;
   identifying a second set of windows that are active on the desktop of the computer;
   comparing the first set of windows to the second set of windows to identify a new window in the second set;
   adding the new window to a map of the graphical user interface of the application; and
   analyzing the man to determine if the new window is already present in the map, wherein the new window is determined to already be present in the map if the new window and the window in the map have the same name.

6. A computer implemented method of mapping a graphical user interface of an application, comprising:
   identifying a first set of windows that are active on the desktop of the computer;
   performing an action on a graphical user interface object in a window of the application;
   identifying a second set of windows that are active on the desktop of the computer;
   comparing the first set of windows to the second set of windows to identify a new window in the second set;
   analyzing the map to determine if the new window is already present in the map;
   adding the new window to a map of the graphical user interface of the application; and
   receiving input from a user that two or more windows of the map that have been determined as different should be considered the same window.

7. A computer implemented method of mapping a graphical user interface of an application, comprising:
   identifying a first set of windows that are active on the desktop of the computer;
   performing an action on a graphical user interface object in a window of the application;
   identifying a second set of windows that are active on the desktop of the computer;
   comparing the first set of windows to the second set of windows to identify a new window in the second set;
   analyzing the map to determine if the new window is already present in the map;
   adding the new window to a map of the graphical user interface of the application; and
   receiving input from a user that two or more windows of the map that have been determined as the same should be considered different windows.

8. A computer implemented method of mapping a graphical user interface of an application, comprising:
   identifying a first set of windows that are active on the desktop of the computer;
   performing an action on a graphical user interface object in a window of the application;
   identifying a second set of windows that are active on the desktop of the computer;
   comparing the first set of windows to the second set of windows to identify a new window in the second set;
   adding the new window to a map of the graphical user interface of the application; and
   receiving input from a user that one or more graphical user interface objects should be ignored when generating the map.

9. A computer implemented method of mapping a graphical user interface of an application, comprising:
   identifying a first set of windows that are active on the desktop of the computer;
   performing an action on a graphical user interface object in a window of the application;

receiving input from a user specifying an amount of time to wait after performing the action before identifying a second set of windows;

identifying the second set of windows that are active on the desktop of the computer;

comparing the first set of windows to the second set of windows to identify a new window in the second set; and adding the new window to a map of the graphical user interface of the application.

10. A computer implemented method of mapping a graphical user interface of an application, comprising:

identifying a first set of windows that are active on the desktop of the computer;

performing an action on a graphical user interface object in a window of the application;

identifying a second set of windows that are active on the desktop of the computer;

comparing the first set of windows to the second set of windows to identify a new window in the second set;

adding the new window to a map of the graphical user interface of the application;

analyzing the map to determine if the new window is already present in the map; and adding a shortcut to the map if the new window is already present in the map, wherein the shortcut references the new window that is already present in the map.

11. A computer program product for mapping a graphical user interface of an application, comprising:

computer code that identifies a first set of windows that are active on the desktop of the computer;

computer code that performs an action on a graphical user interface object in a window of the application;

computer code that identifies a second set of windows that are active on the desktop of the computer;

computer code that compares the first set of windows to the second set of windows to identify a new window in the second set;

computer code that adds the new window to a map of the graphical user interface of the application;

computer code that displays the map on the computer; and a computer readable medium that stores the computer codes.

12. A computer program product for mapping a graphical user interface of an application, comprising:

computer code that identifies a first set of windows that are active on the desktop of the computer;

computer code that performs an action on a graphical user interface object in a window of the application;

computer code that identifies a second set of windows that are active on the desktop of the computer;

computer code that compares the first set of windows to the second set of windows to identify a new window in the second set;

computer code that adds the new window to a map of the graphical user interface of the application, wherein the map is hierarchical and includes windows, graphical user interface objects and actions; and a computer readable medium that stores the computer codes.

13. A computer program product for mapping a graphical user interface of an application, comprising:

computer code that identifies a first set of windows that are active on the desktop of the computer;

computer code that performs an action on a graphical user interface object in a window of the application;

computer code that identifies a second set of windows that are active on the desktop of the computer;

computer code that compares the first set of windows to the second set of windows to identify a new window in the second set;

computer code that analyzes the map to determine if the new window is already present in the map, wherein the new window is determined to already be present in the map if similarities between the new window and the window in the map are above a similarity threshold;

computer code that adds the new window to a map of the graphical user interface of the application; and a computer readable medium that stores the computer codes.

14. The computer program product of claim 13, wherein the similarity threshold is a percentage of graphical user interface objects that the new window and the window in the map have in common.

15. A computer program product for mapping a graphical user interface of an application, comprising:

computer code that identifies a first set of windows that are active on the desktop of the computer;

computer code that performs an action on a graphical user interface object in a window of the application;

computer code that identifies a second set of windows that are active on the desktop of the computer;

computer code that compares the first set of windows to the second set of windows to identify a new window in the second set;

computer code that adds the new window to a map of the graphical user interface of the application;

computer code that analyzes the map to determine if the new window is already present in the map, wherein the new window is determined to already be present in the map if the new window and the window in the map have the same name; and a computer readable medium that stores the computer codes.

16. A computer program product for mapping a graphical user interface of an application, comprising:

computer code that identifies a first set of windows that are active on the desktop of the computer;

computer code that performs an action on a graphical user interface object in a window of the application;

computer code that identifies a second set of windows that are active on the desktop of the computer;

computer code that compares the first set of windows to the second set of windows to identify a new window in the second set;

computer code that analyzes the map to determine if the new window is already present in the map;

computer code that adds the new window to a map of the graphical user interface of the application;

computer code that receives input from a user that two or more windows of the map that have been determined as different should be considered the same window; and a computer readable medium that stores the computer codes.

17. A computer program product for mapping a graphical user interface of an application, comprising:

computer code that identifies a first set of windows that are active on the desktop of the computer;

computer code that performs an action on a graphical user interface object in a window of the application;

computer code that identifies a second set of windows that are active on the desktop of the computer;

computer code that compares the first set of windows to the second set of windows to identify a new window in the second set;

computer code that analyzes the map to determine if the new window is already present in the map;

computer code that adds the new window to a map of the graphical user interface of the application;

computer code that receives input from a user that two or more windows of the map that have been determined as the same should be considered different windows; and a computer readable medium that stores the computer codes.

18. A computer program product for mapping a graphical user interface of an application, comprising:

computer code that identifies a first set of windows that are active on the desktop of the computer;

computer code that performs an action on a graphical user interface object in a window of the application;

computer code that identifies a second set of windows that are active on the desktop of the computer;

computer code that compares the first set of windows to the second set of windows to identify a new window in the second set;

computer code that adds the new window to a may of the graphical user interface of the application;

computer code that receives input from a user that one or more graphical user interface objects should be ignored when generating the map; and a computer readable medium that stores the computer codes.

19. A computer program product for mapping a graphical user interface of an application, comprising:

computer code that identifies a first set of windows that are active on the desktop of the computer;

computer code that performs an action on a graphical user interface object in a window of the application;

computer code that receives input from a user specifying an amount of time to wait after performing the action before identifies a second set of windows;

computer code that identifies the second set of windows that are active on the desktop of the computer;

computer code that compares the first set of windows to the second set of windows to identify a new window in the second set;

computer code that adds the new window to a map of the graphical user interface of the application; and a computer readable medium that stores the computer codes.

20. A computer program product for mapping a graphical user interface of an application, comprising:

computer code that identifies a first set of windows that are active on the desktop of the computer;

computer code that performs an action on a graphical user interface object in a window of the application;

computer code that identifies a second set of windows that are active on the desktop of the computer;

computer code that compares the first set of windows to the second set of windows to identify a new window in the second set;

computer code that adds the new window to a may of the graphical user interface of the application;

computer code that analyzes the map to determine if the new window is already present in the map;

computer code that adds a shortcut to the map if the new window is already present in the map, wherein the shortcut references the new window that is already present in the map; and a computer readable medium that stores the computer codes.

21. A system for testing applications, comprising:

an application mapper that programmatically executes an application to generate a map of the graphical user interface of the application, the application mapper adding a new window to the map by performing an action in the graphical user interface and identifying the new window by comparing windows in the graphical user interface before and after the action;

a script generator that utilizes the map to generate scripts that include instructions to test the application; and an application tester that executes the scripts to test the application.

22. The system of claim 21, wherein the application mapper generates the map by recursively performing actions on the graphical user interface of the application to identify new windows and adding the new windows to the map.

23. The system of claim 21, wherein the map is hierarchical and includes windows, graphical user interface objects and actions.

24. The system of claim 23, wherein the graphical user interface objects are buttons, sliders, check boxes, or tab controls.

25. The system of claim 23, wherein the actions are left mouse click, right mouse click, left mouse double click, or keystrokes.

* * * * *